US012670155B2

(12) United States Patent (10) Patent No.: US 12,670,155 B2

Shaik et al. (45) Date of Patent: Jun. 30, 2026

(54) CONVERTING HUMAN-READABLE QUERIES TO MACHINE-READABLE QUERIES

(71) Applicant: Dell Products L.P., Round Rock, TX (US)

(72) Inventors: Javedh Jafferi Shaik, Rajahmundry (IN); RamaRaju Penumetcha Sai Venka, Hyderabad (IN); Bijan Mohanty, Austin, TX (US); Hung Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/932,274

(22) Filed: Oct. 30, 2024

(65) Prior Publication Data

US 2026/0119483 A1 Apr. 30, 2026

(51) Int. Cl.
G06F 16/2452 (2019.01)
G06F 16/21 (2019.01)
G06F 16/2455 (2019.01)

(52) U.S. Cl.
CPC ...... G06F 16/24522 (2019.01); G06F 16/212 (2019.01); G06F 16/2455 (2019.01)

(58) Field of Classification Search
CPC ............. G06F 16/24522; G06F 16/212; G06F 16/2455
See application file for complete search history.

(56) References Cited

U.S. PATENT DOCUMENTS

| | | | | |
|---|---|---|---|---|
| 11,954,102 | B1 * | 4/2024 | Palaniappan | ....... G06F 16/2237 |
| 2024/0403796 | A1 * | 12/2024 | Ahmed | ................ G06Q 10/067 |
| 2025/0086213 | A1 * | 3/2025 | Dilipkumar | ....... G06F 16/24522 |
| 2025/0147956 | A1 * | 5/2025 | Payani | .............. G06F 16/24522 |

OTHER PUBLICATIONS

Hong, Next-Generation Database Interfaces: A Survey of LLM-based Text-to-SQL, pp. 1-18, Jul. 2024.*
Liu, A Survey of NL2SQL with Large Language Models: Where are we, and where are we going?, pp. 1-31, Aug. 9, 2024.*
Shah, Transforming Natural Language Text to SQL: Harnessing RAG and LLMs for Precision Querying, pp. 1-17, Jul. 5, 2024.*

* cited by examiner

*Primary Examiner* — Albert M Phillips, III
(74) *Attorney, Agent, or Firm* — Harrity & Harrity, LLP

(57) ABSTRACT

In some implementations, a query system may receive a natural language prompt from a user. The query system may convert the natural language prompt into a structured query language (SQL) query using a large language model (LLM) and schema information associated with a monitoring database. The query system may execute the SQL query against the monitoring database to receive monitoring results. The query system may convert the monitoring results into a natural language response, using the LLM, for output to the user.

20 Claims, 9 Drawing Sheets

100

Cloud system

105
Data associated with
cloud application(s)

Monitoring
database

110
Schema query

115
Schema information

Query system

120
Schema
information

Vector
database

100

140
Database query

145
Error

Query system

Monitoring
database

100

170
Database query

175
Monitoring results

Monitoring database

180
Derive measurement(s) from the monitoring results

Query system

100

185
Convert the monitoring results to a natural language representation

Query system

190
Natural language representation

User device

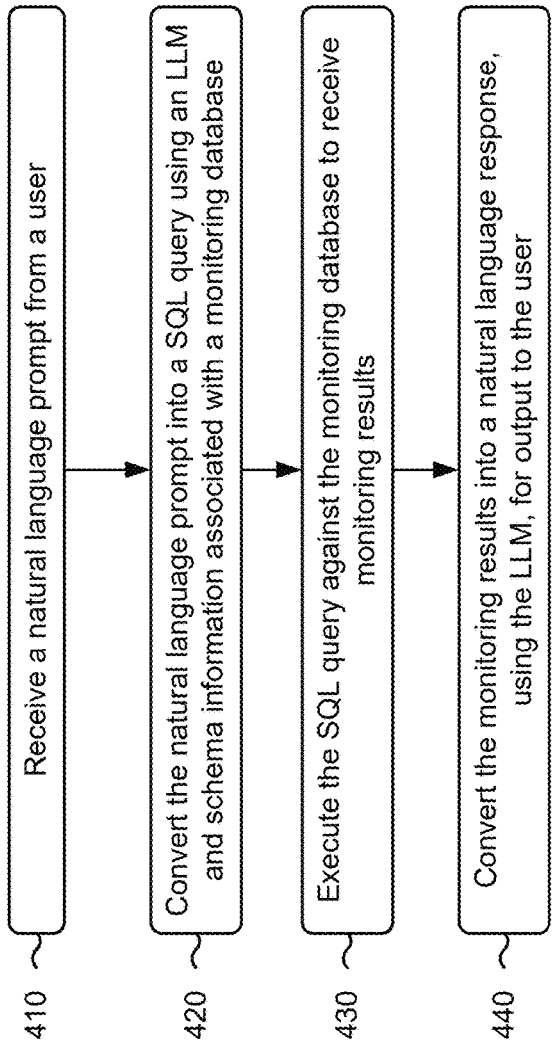

400

410     Receive a natural language prompt from a user

420     Convert the natural language prompt into a SQL query using an LLM and schema information associated with a monitoring database 430     Execute the SQL query against the monitoring database to receive monitoring results 440     Convert the monitoring results into a natural language response, using the LLM, for output to the user

FIG. 4

CONVERTING HUMAN-READABLE QUERIES TO MACHINE-READABLE QUERIES

BACKGROUND

Database queries, such as structured query language (SQL) queries, require knowledge of SQL syntax, as well as schemas for the databases, to construct. Therefore, a user may consume computing and network resources in order to research and construct a SQL query.

SUMMARY

Some implementations described herein relate to a device. The device may include one or more processors. The one or more processors may be configured to receive a natural language prompt from a user. The one or more processors may be configured to convert the natural language prompt into a SQL query using a large language model (LLM) and schema information associated with a monitoring database. The one or more processors may be configured to execute the SQL query against the monitoring database to receive monitoring results. The one or more processors may be configured to convert the monitoring results into a natural language response, using the LLM, for output to the user.

Some implementations described herein relate to a method. The method may include receiving, by a query system, a natural language prompt from a user. The method may include converting, by the query system, the natural language prompt into a SQL query using an LLM and schema information associated with a monitoring database. The method may include executing, by the query system, the SQL query against the monitoring database to receive monitoring results. The method may include converting, by the query system, the monitoring results into a natural language response, using the LLM, for output to the user.

Some implementations described herein relate to a non-transitory computer-readable medium that stores a set of instructions. The set of instructions, when executed by one or more processors of a device, may cause the device to receive a natural language prompt from a user. The set of instructions, when executed by one or more processors of the device, may cause the device to convert the natural language prompt into a SQL query using an LLM and schema information associated with a monitoring database. The set of instructions, when executed by one or more processors of the device, may cause the device to execute the SQL query against the monitoring database to receive monitoring results. The set of instructions, when executed by one or more processors of the device, may cause the device to convert the monitoring results into a natural language response, using the LLM, for output to the user.

BRIEF DESCRIPTION OF THE DRAWINGS

FIG. 4 is a flowchart of an example process relating to converting human-readable queries to machine-readable queries, in accordance with some embodiments of the present disclosure.

DETAILED DESCRIPTION

The following detailed description of example implementations refers to the accompanying drawings. The same reference numbers in different drawings may identify the same or similar elements.

Machine-readable queries, such as SQL queries, require knowledge of SQL syntax, as well as database schemas, to construct. Therefore, a user may consume computing and network resources in order to research and construct a SQL query. SQL queries may be used to obtain monitoring results (e.g., from monitoring software deployed on a cloud system). Because some users cannot construct SQL queries, latency in obtaining monitoring results may be increased, which leads to increased downtime for the cloud system.

An LLM may be used to construct a SQL query from a natural language prompt. Some implementations described herein enable the LLM to automatically retrieve schema information and to convert the natural language prompt to the SQL query using the schema information. As a result, computing and network resources are conserved that otherwise would have been spent in researching and constructing the SQL query (e.g., by a user). Additionally, because more users may prompt the LLM than can construct SQL queries, latency in obtaining monitoring results may be decreased, which leads to increased uptime (e.g., for a cloud system associated with the monitoring results).

FIGS. 1A-1F are diagrams of an example 100 associated with converting human-readable queries to machine-readable queries. As shown in FIGS. 1A-1F, example 100 includes a cloud system, a query system, a monitoring database, a vector database, and a user device. These devices are described in more detail in connection with FIGS. 2 and 3.

Figure 1A:
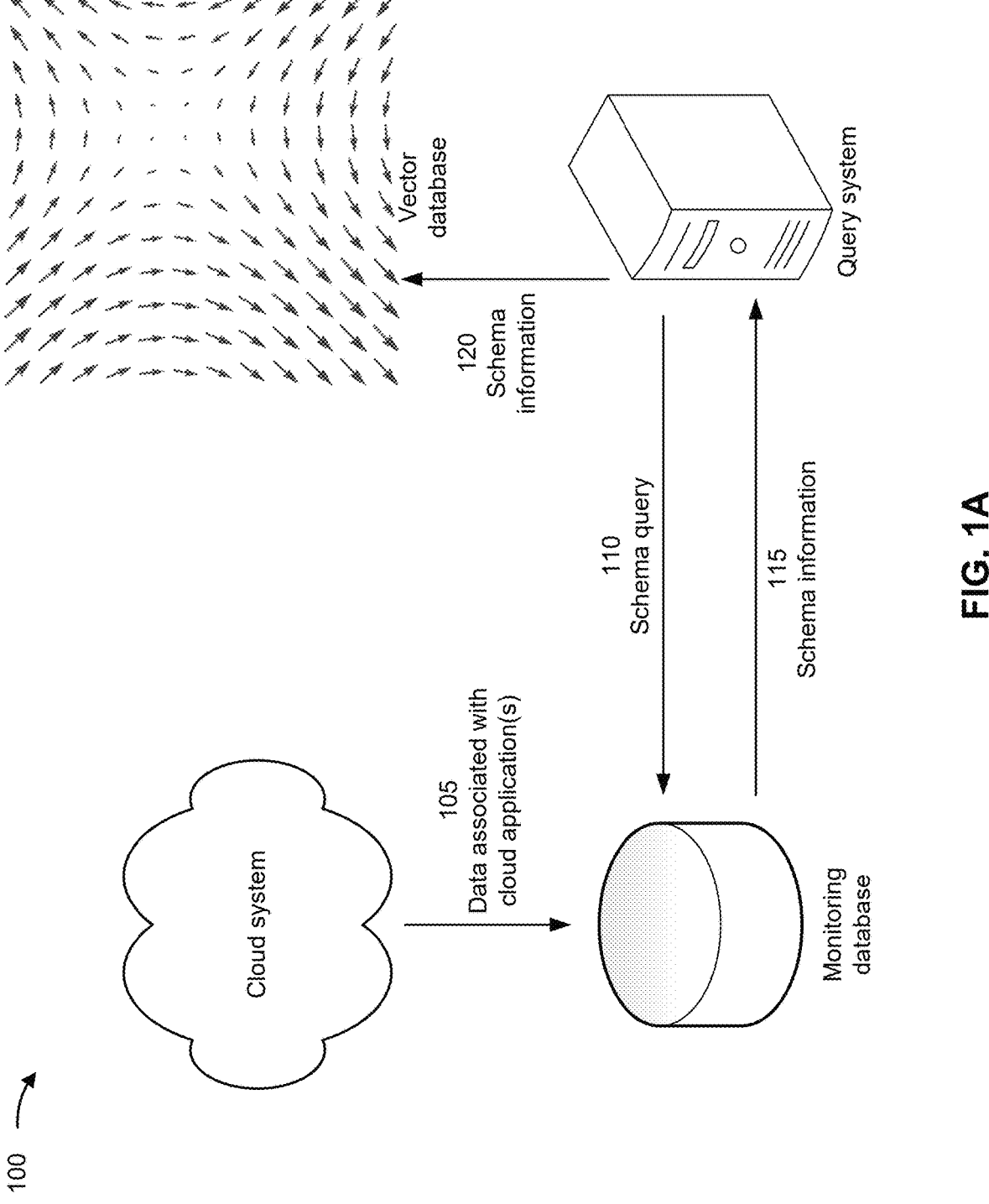
FIGS. 1A-1F are diagrams of an example implementation relating to converting human-readable queries to machine-readable queries, in accordance with some embodiments of the present disclosure.

As shown in FIG. 1A and by reference number 105, the cloud system may transmit, and the monitoring database may receive, data associated with one or more cloud applications (deployed on the cloud system). For example, monitoring software deployed on the cloud system may transmit monitoring results to the monitoring database. The monitoring results may be encoded in log files, comma-separated values (CSV) files, and/or other types of data structures. The monitoring software may periodically transmit the data to the monitoring database for storage. Although the example 100 is described in connection with the cloud system, other examples may include monitoring results from other systems (e.g., a server, a server rack, and/or a set of user devices, among other examples).

As shown by reference number 110, the query system may transmit, and the monitoring database may receive, a schema query. For example, the schema query may be a SQL query configured to retrieve schema information for the monitoring database. In some implementations, the query system may transmit the schema query periodically (e.g., according to a schedule). Accordingly, as shown by reference number 115, the monitoring database may transmit, and the query system may receive, the schema information in response to the schema query. An example schema query is as follows:

```
SELECT
    t.name AS TableName,
    c.name AS ColumnName,
    ty.name AS Data Type,
```

```
        c.max_length AS MaxLength,
        c.precision AS Precision,
        c.scale AS Scale,
        c.is_nullable AS IsNullable,
        fk.name AS ForeignKeyName,
        rt.name AS ReferencedTableName,
        rc.name AS ReferencedColumnName
    FROM
        sys.tables t
    INNER JOIN
        sys.columns c ON t.object_id=c.object_id
    LEFT JOIN
        sys.types ty ON c.user_type_id=ty.user_type_id
    LEFT JOIN
        sys.foreign_keys          fk           ON
            fk.parent_object_id=t.object_id
    LEFT JOIN
        sys.tables rt ON fk.referenced_object_id=rt.object_id
    LEFT JOIN
        sys.foreign_key_columns        fkc         ON
            fk.object_id=fkc.constraint_object_id
    LEFT JOIN
        sys.columns              rc            ON
            fkc.referenced_object_id=rc.object_id
            AND fkc.referenced_column_id=rc.column_id
    ORDER BY
        t.name, c.column_id;
```

As shown by reference number 120, the query system may store the schema information in the vector database. The vector database may be at least partially integrated (e.g., physically, virtually, and/or logically) with the query system. Accordingly, the query system may transmit a command to store the schema information on a bus (or another wired or wireless connection). Alternatively, the vector database may be separate from the query system. Accordingly, the query system may transmit a command to store the schema information using an application programming interface (API) provided by the vector database.

Figure 1B:
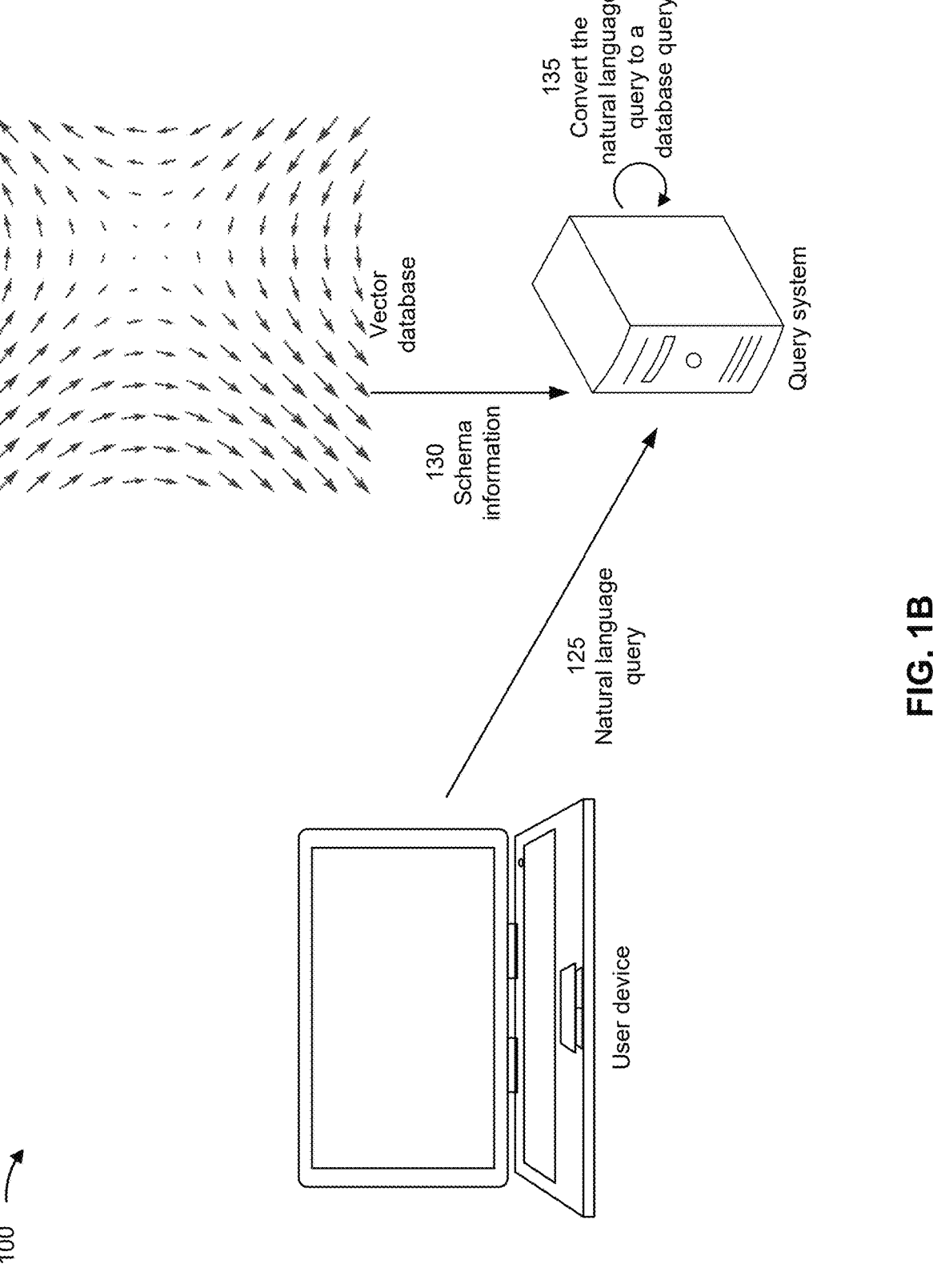

The query system may receive a natural language prompt from a user. As shown in FIG. 1B and by reference number 125, the user device may transmit, and the query system may receive, the natural language prompt. An example natural language prompt is as follows:

Monitor a data transfer rate between APJ and EMEA for next 1 hour and display in tabular format if speed deviates more or less than 10 percent from the expected transfer rate.

In some implementations, the user may provide input to the user device (e.g., via an input component) that triggers the user device to transmit the natural language prompt. For example, the user device may output (e.g., via an output component) a user interface (UI), and the user may interact with the UI to trigger the user device to transmit the natural language prompt. In another example, the user may provide text-based input (e.g., via a command line or a shell) that triggers the user device to transmit the natural language prompt.

As shown by reference number 130, the query system may query the vector database to retrieve the schema information (before converting the natural language prompt into a SQL query, as described below). For example, the query system may transmit (and the vector database may receive) a request for the schema information, and the vector database may transmit (and the query system may receive) the schema information in response to the request.

As shown by reference number 135, the query system may convert the natural language prompt into a SQL query using an LLM and the schema information. For example, the query system may prompt the LLM for the SQL query and provide both the natural language prompt and the schema information as input. The example SQL query output by the LLM for the natural language prompt example above may be as follows:

SELECT ft.File_Id, ft.File_Name, ft.File_Size, ft.Source, ft.Destination, ft.Received_Date Time, ft.Status, ft.Completed_Date Time, s.Server_Id, s.Server_Name, s.Region, s.Expected_Transfer_Rate, CASEWHEN (ft.File_Size/(DATEDIFF(mi, ft.Received_Date Time, ft.Completed_Date Time)*60)) (s.Expected_ Transfer_Rate*1.1) THEN 'Above 10% deviation'WHEN (ft.File_Size/(DATEDIFF(mi, ft.Received_DateTime, ft.Completed_DateTime)*60)) <(s.Expected_Transfer_Rate*0.9) THEN 'Below 10% deviation'ELSE 'Within expected range'END AS Transfer_Rate_StatusFROM File_Transfer_Table ft.JOIN Server_Table s ON ft.Source=s.Server_NameWHERE (s.Region='APJ' AND ft.Destination='EMEA') AND ft.Received_DateTime>=DATEADD(hour,−1, GET-DATE( ))

In some implementations, the query system may map extracted information from the natural language prompt to database entities (e.g., using the LLM or by preprocessing the natural language prompt using the schema information). Additionally, the query system may construct one or more SQL commands in the SQL query to handle joins, filters, or aggregations (e.g., using the LLM).

Figure 1C:
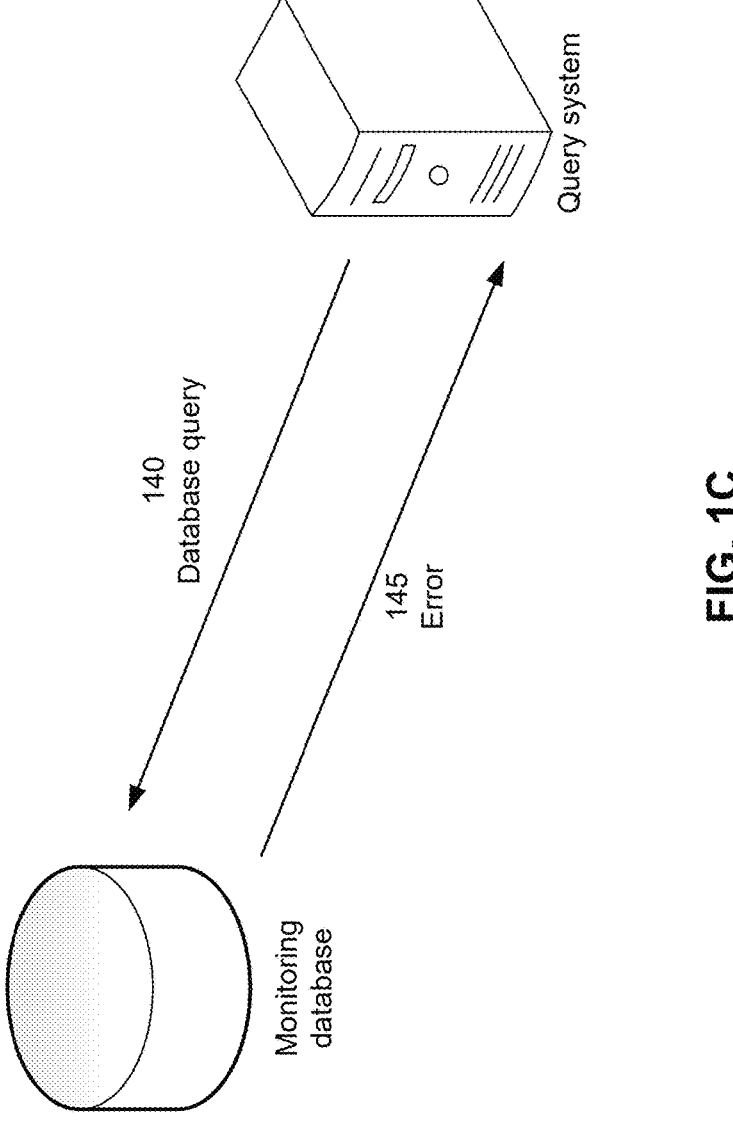

As shown in FIG. 1C and by reference number 140, the query system may execute the SQL query against the monitoring database. For example, the query system may schedule execution of the SQL query according to a monitoring interval indicated in the natural language prompt. In the example described above, the query system may schedule the SQL query to execute currently and again in one hour.

In some implementations, and as described in connection with FIG. 1E, the query system may receive monitoring results based on executing the SQL query. However, in some situations, the monitoring database may return an error, as shown in FIG. 1C by reference number 145. Based on detecting the error, the query system may execute a schema query to generate updated schema information, as shown in FIG. 1D and by reference number 150.

Figure 1D:
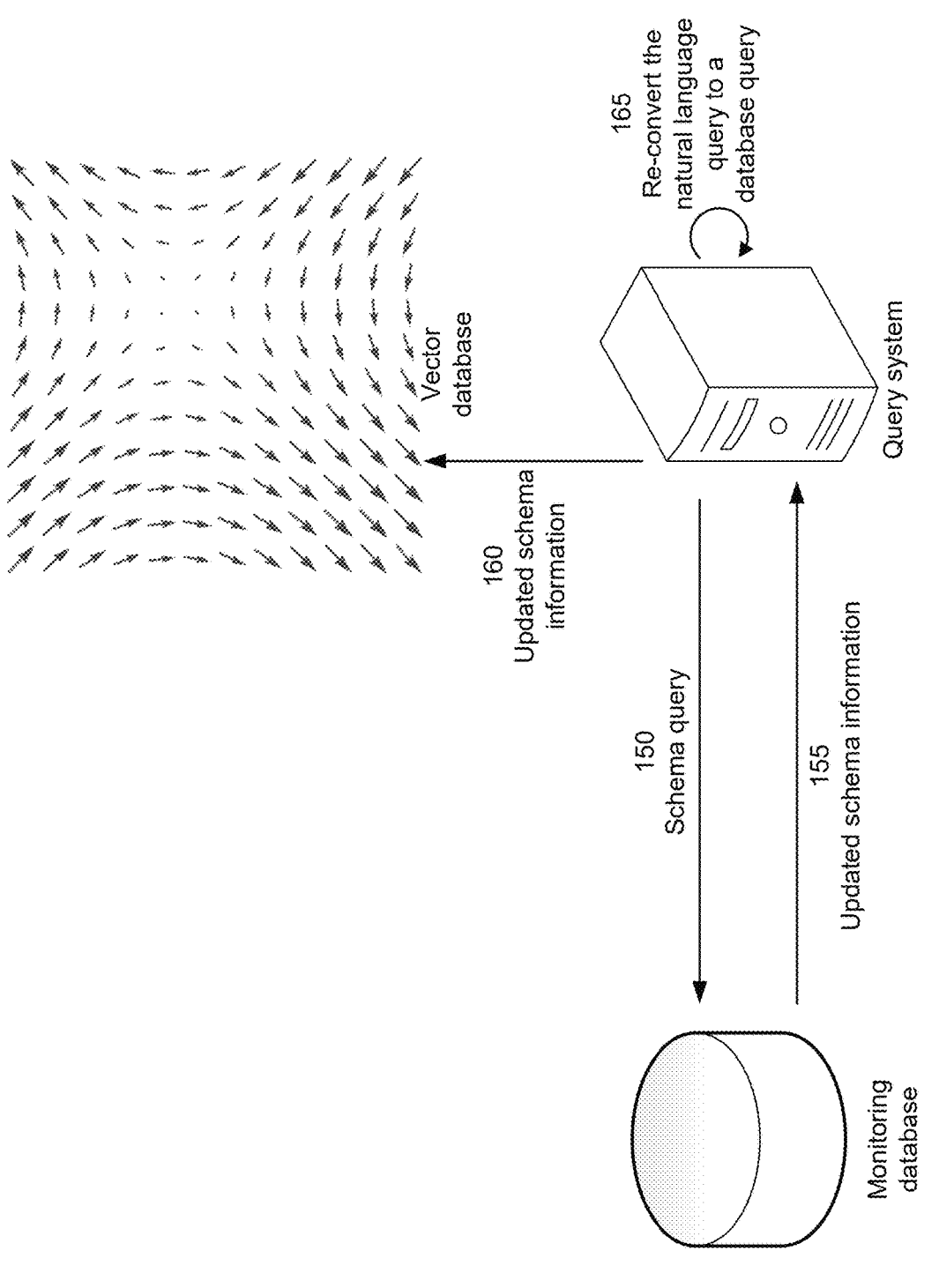
Figure 1E:
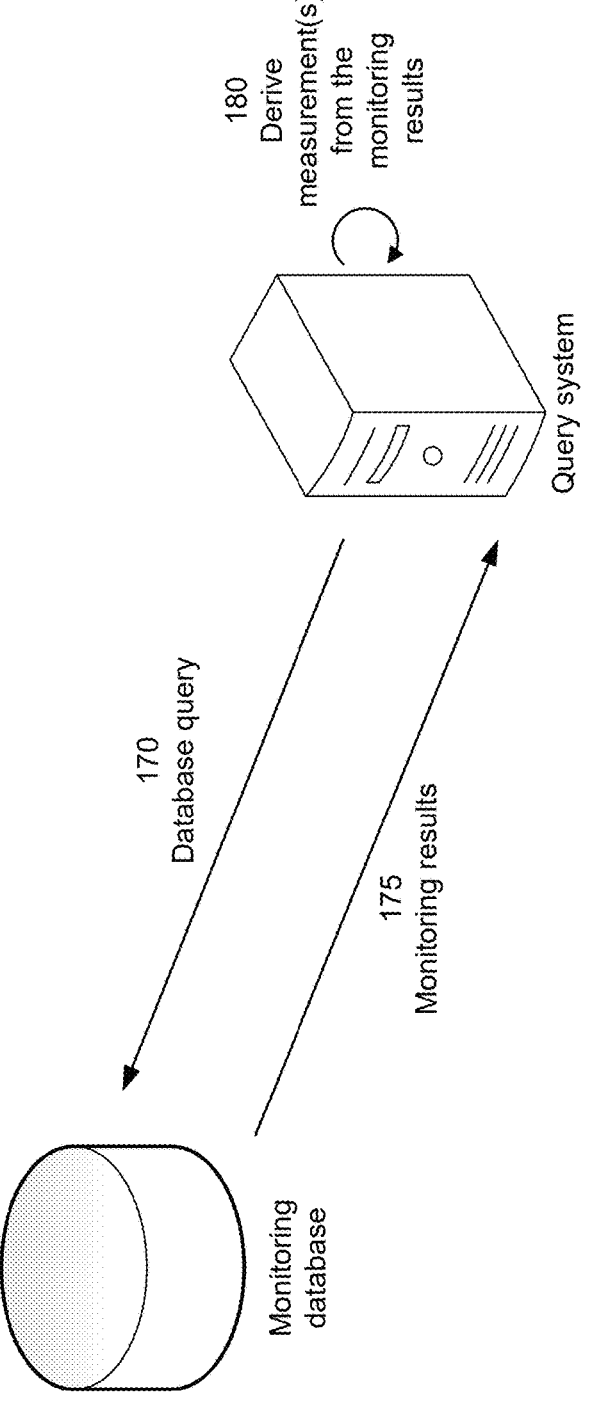

Accordingly, as shown in FIG. 1D by reference number 155, the monitoring database may transmit, and the query system may receive, the updated schema information in response to the schema query. An example of schema information for the example schema query described above is as follows:

```
{
    "tables": [
        {
            "name": "FileTransfer",
            "columns": [
                {
                    "name": "FileId",
                    "type": "INT",
                    "constraints": "PRIMARY KEY"
                },
                {
                    "name": "FileName",
                    "type": "NVARCHAR(255)"
                },
                {
                    "name": "FileSize",
```

-continued

```
            "type": "DECIMAL(18,2)"
        },
        {
            "name": "Source",
            "type": "NVARCHAR(255)"
        },
        {
            "name": "Destination",
            "type": "NVARCHAR(255)"
        },
        {
            "name": "ReceivedDateTime",
            "type": "DATETIME"
        },
        {
            "name": "Status",
            "type": "NVARCHAR(50)"
        },
        {
            "name": "CompletedDateTime",
            "type": "DATETIME"
        }
        ]
    },
    {
        "name": "Server",
        "columns": [
        {
            "name": "ServerId",
            "type": "INT",
            "constraints": "PRIMARY KEY"
        },
        {
            "name": "ServerName",
            "type": "NVARCHAR(255)"
        },
        {
            "name": "Region",
            "type": "NVARCHAR(100)"
        },
        {
            "name": "ExpectedTransferRate",
            "type": "DECIMAL(18,2)"
        }
        ]
    }
```

(or another wired or wireless connection). In another example, the query system may transmit a command to store the updated schema information using an API provided by the vector database.

Additionally, as shown by reference number 165, the query system may convert the natural language prompt into a SQL query using the LLM and the updated schema information. As a result, the query system may automatically recover from errors, which reduces latency and conserves computing resources that otherwise would have been spent on debugging the errors As shown in FIG. 1E and by reference number 170, the query system may execute the SQL query against the monitoring database. For example, the query system may schedule execution of the SQL query according to the monitoring interval indicated in the natural language prompt.

As shown by reference number 175, the monitoring database may transmit, and the query system may receive, monitoring results based on the SQL query. In some implementations, and as shown by reference number 180, the query system may derive one or more measurements from the monitoring results. For example, the query system may determine averages, medians, modes, and/or standard deviations, among other examples, if requested by the user in the natural language prompt.

Figure 1F:
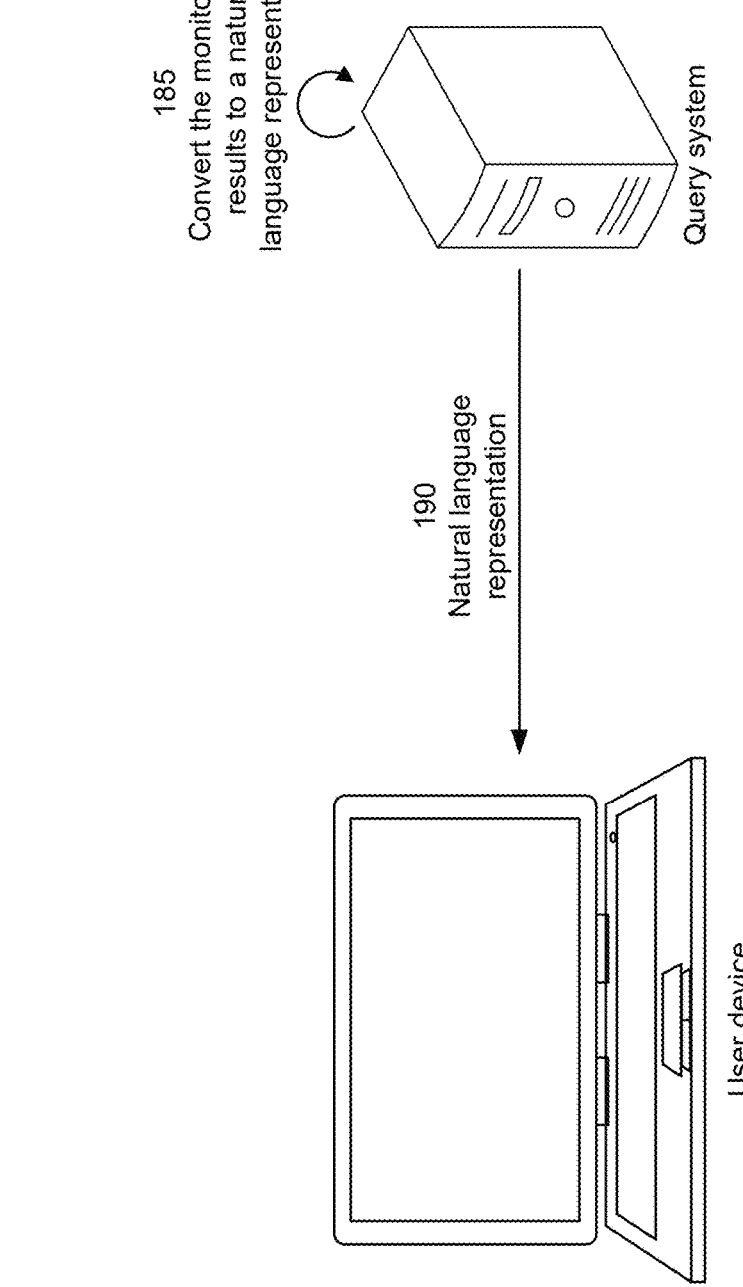

As shown in FIG. 1F and by reference number 185, the query system may convert the monitoring results into a natural language response, using the LLM, for output to the user. For example, the query system may generate a table, a narrative, or another type of natural language response. One example natural language response for the example SQL query described above is as follows:

| File Id | File Name | File Size | Source | Destination | Received DateTime | Status | Completed DateTime | Server Id | Server Name | Region | Expected Transfer Rate | Transfer Rate Status |
|---|---|---|---|---|---|---|---|---|---|---|---|---|
| 1 | file1.txt | 500 | Server1 | EMEA | 00:00.0 | Completed | 30:00.0 | 1 | Server1 | APJ | 100 | Within expected range |
| 3 | file3.txt | 700 | Server3 | EMEA | 45:00.0 | Completed | 00:00.0 | 3 | Server3 | APJ | 120 | Above 10% deviation |
| 4 | file4.txt | 600 | Server4 | EMEA | 15:00.0 | Completed | 45:00.0 | 4 | Server4 | APJ | 110 | Within expected range |
| 5 | file5.txt | 900 | Server5 | EMEA | 30:00.0 | Completed | 00:00.0 | 5 | Server5 | APJ | 130 | Below 10% deviation |
| 6 | file6.txt | 800 | Server6 | EMEA | 45:00.0 | Completed | 15:00.0 | 6 | Server6 | EMEA | 140 | Within expected range |

-continued

```
        ]
    }
```

As shown by reference number 160, the query system may store the updated schema information in the vector database. For example, the query system may transmit a command to store the updated schema information on a bus Another example natural language response for the example SQL query described above is as follows:

Server 1, Server 4, and Server 6 have data transfer rates that are within 10% of expected transfer rates. Server 3 has a data transfer rate that exceeds an expected transfer rate by more than 10%, and Server 5 has a data transfer rate that undershoots an expected transfer rate by more than 10%.

The model system may output the natural language response via a communication channel that is selected based on the natural language prompt. For example, the communication channel may include an email address or a phone number, among other examples. As shown by reference number 190, the model system may transmit, and the user device may receive, the natural language response via a communication channel that is selected based on the natural language prompt. In some implementations, the query system may additionally or alternatively transmit a command to instantiate a service ticket in an issue tracking system (e.g., as described in connection with FIG. 2) based on an anomaly detected in the monitoring results. In the example above, the query system may open a service ticket based on Server 3 having a data transfer rate that exceeds an expected transfer rate by more than 10% and/or a service ticket based on Server 5 having a data transfer rate that undershoots an expected transfer rate by more than 10%.

By using techniques as described in connection with FIGS. 1A-1F, the LLM automatically retrieves the schema information used to convert the natural language prompt to the SQL query. As a result, computing and network resources are conserved that otherwise would have been spent in researching and constructing the SQL query (e.g., by the user). Additionally, because more users may prompt the LLM than can construct SQL queries, latency in obtaining the monitoring results may be decreased, which leads to increased uptime (e.g., for the cloud application(s)).

As indicated above, FIGS. 1A-1F are provided as an example. Other examples may differ from what is described with regard to FIGS. 1A-1F.

Figure 2:
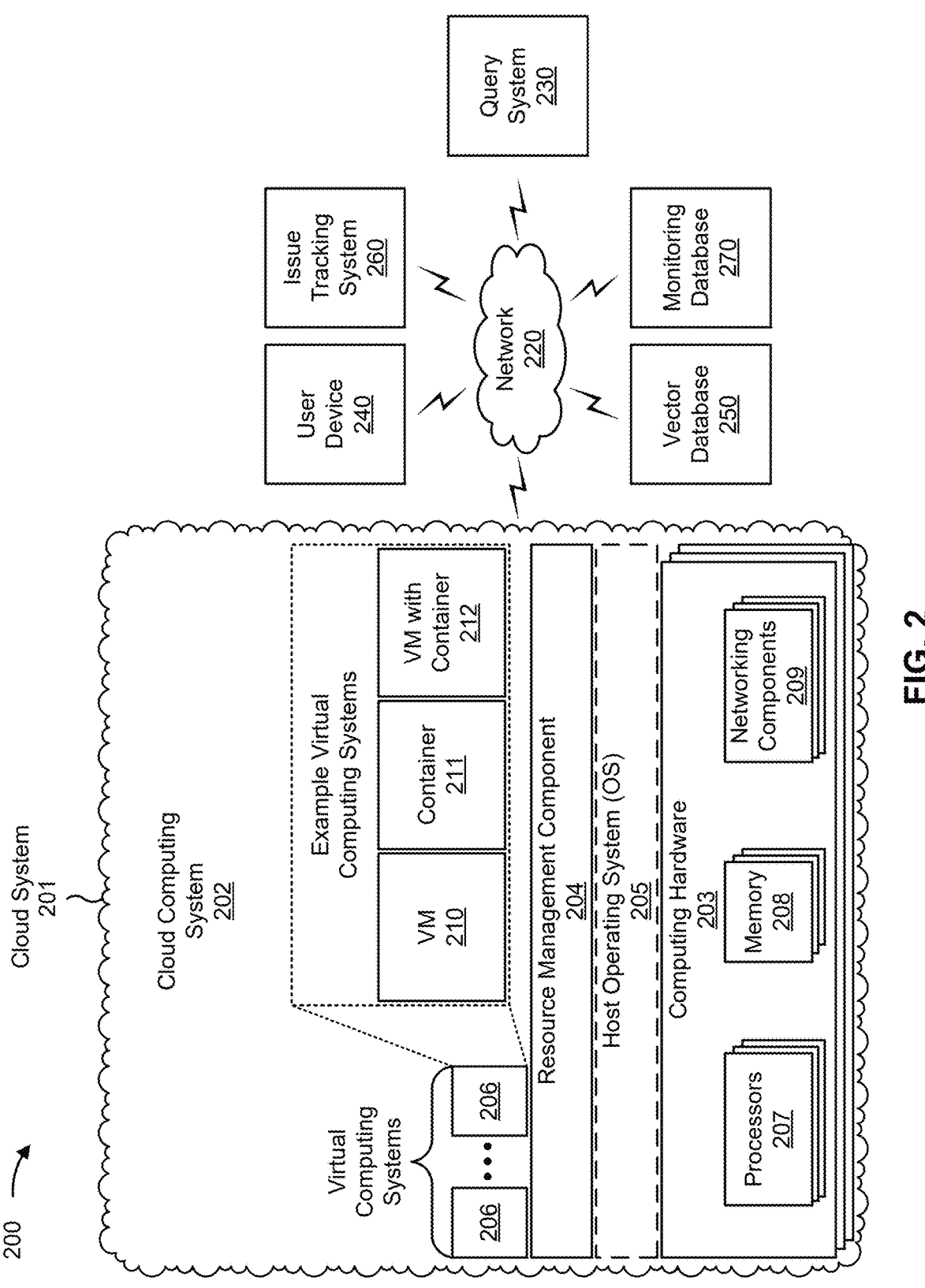
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a cloud system 201, which may include one or more elements of and/or may execute within a cloud computing system 202. The cloud computing system 202 may include one or more elements 203-212, as described in more detail below. As further shown in FIG. 2, environment 200 may include a network 220, a query system 230, a user device 240, a vector database 250, an issue tracking system 260, and/or a monitoring database 270. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the cloud system 201 may include one or more elements 203-212 of the cloud computing system 202, may execute within the cloud computing system 202, and/or may be hosted within the cloud computing system 202, in some implementations, the cloud system 201 may not be cloud-based (e.g., may be implemented outside of a cloud computing system) or may be partially cloud-based. For example, the cloud system 201 may include one or more devices that are not part of the cloud computing system 202, such as device 300 of FIG. 3, which may include a standalone server or another type of computing device. The cloud system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The query system 230 may include one or more devices capable of receiving, generating, storing, processing, providing, and/or routing information associated with natural language prompts and SQL queries, as described elsewhere herein. For example, the query system 230 may use an LLM as described herein. The query system 230 may include a communication device and/or a computing device. For example, the query system 230 may include a server, such as an application server, a client server, a web server, a database server, a host server, a proxy server, a virtual server (e.g., executing on computing hardware), or a server in a cloud computing system. In some implementations, the query system 230 may include computing hardware used in a cloud computing environment. The query system 230 may communicate with one or more other devices of environment 200, as described elsewhere herein.

The user device 240 may include one or more devices capable of receiving, generating, storing, processing, and/or providing information associated with natural language prompts, as described elsewhere herein. The user device 240 may include a communication device and/or a computing device. For example, the user device 240 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 240 may communicate with one or more other devices of environment 200, as described elsewhere herein.

The vector database 250 may include one or more devices capable of receiving, generating, storing, processing, and/or providing information associated with schemas, as described elsewhere herein. The vector database 250 may include a communication device and/or a computing device. For example, the vector database 250 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The vector database 250 may communicate with one or more other devices of environment 200, as described elsewhere herein.

The issue tracking system 260 may include one or more devices capable of receiving, generating, storing, processing, and/or providing information associated with tickets, as described elsewhere herein. The issue tracking system 260 may include a communication device and/or a computing device. For example, the issue tracking system 260 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The issue tracking system 260 may include an issue tracking system, such as Jira® or Bugzilla®, among other examples. The issue tracking system 260 may communicate with one or more other devices of environment 200, as described elsewhere herein.

The monitoring database 270 may include one or more devices capable of receiving, generating, storing, processing, and/or providing information associated with schemas, as described elsewhere herein. The monitoring database 270 may include a communication device and/or a computing device. For example, the monitoring database 270 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The monitoring database 270 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
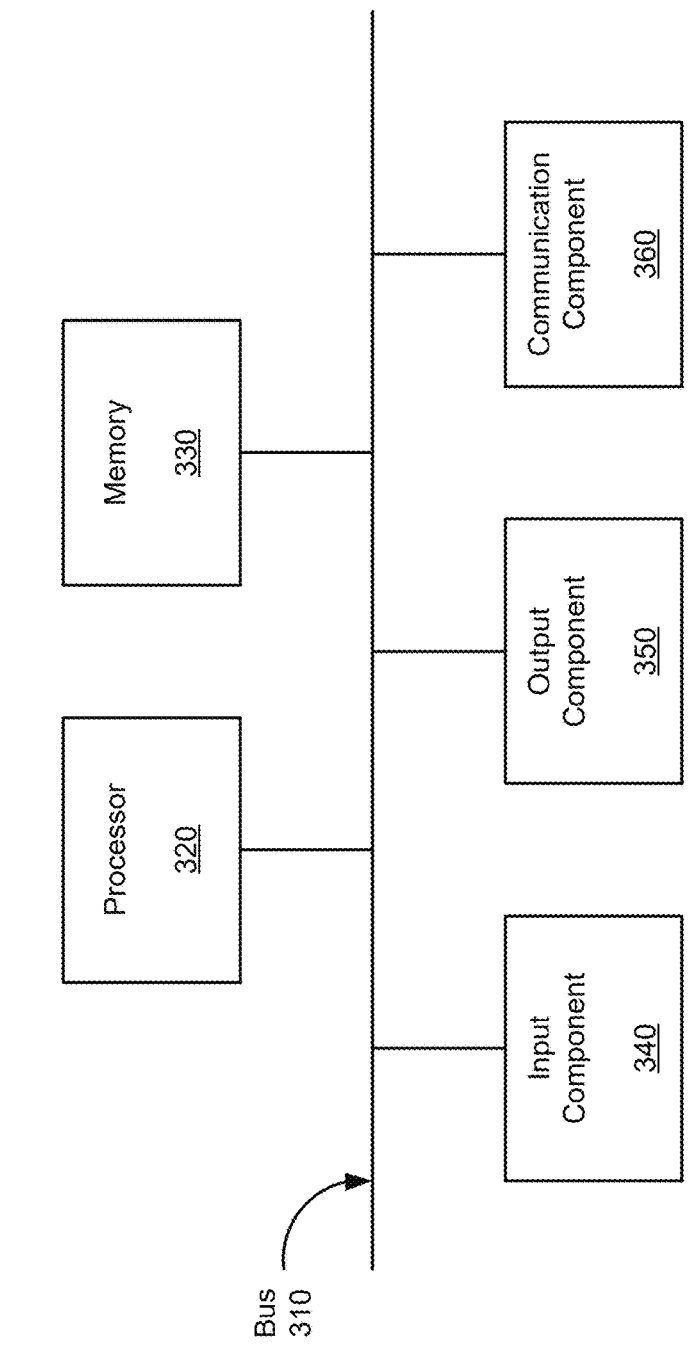
FIG. 3 is a diagram of example components of one or more devices of FIG. 2, in accordance with some embodiments of the present disclosure.

FIG. 3 is a diagram of example components of a device 300 associated with converting human-readable queries to machine-readable queries. The device 300 may correspond to a query system 230, a user device 240, a vector database 250, an issue tracking system 260, and/or a monitoring database 270. In some implementations, a query system 230, a user device 240, a vector database 250, an issue tracking system 260, and/or a monitoring database 270 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with converting human-readable queries to machine-readable queries. In some implementations, one or more process blocks of FIG. 4 are performed by a query system (e.g., query system 230). In some implementations, one or more process blocks of FIG. 4 are performed by another device or a group of devices separate from or including the query system, such as a cloud system 201, user device 240, a vector database 250, an issue tracking system 260, and/or a monitoring database 270. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving a natural language prompt from a user (block 410). For example, the query system may receive a natural language prompt from a user, as described herein.

As further shown in FIG. 4, process 400 may include converting the natural language prompt into a SQL query using an LLM and schema information associated with a monitoring database (block 420). For example, the query system may convert the natural language prompt into a SQL query using an LLM and schema information associated with a monitoring database, as described herein.

As further shown in FIG. 4, process 400 may include executing the SQL query against the monitoring database to receive monitoring results (block 430). For example, the query system may execute the SQL query against the monitoring database to receive monitoring results, as described herein.

As further shown in FIG. 4, process 400 may include converting the monitoring results into a natural language response, using the LLM, for output to the user (block 440).

For example, the query system may convert the monitoring results into a natural language response, using the LLM, for output to the user, as described herein.

Process 400 may include additional implementations, such as any single implementation or any combination of implementations described below and/or in connection with one or more other processes described elsewhere herein.

In a first implementation, process 400 includes converting the natural language prompt into an initial SQL query using the LLM and previous schema information; detecting an error based on executing the initial SQL query; and executing a schema query to generate the schema information in response to the error.

In a second implementation, alone or in combination with the first implementation, converting the natural language prompt into the SQL query includes mapping extracted information from the natural language prompt to database entities, and constructing one or more SQL commands in the SQL query to handle joins, filters, or aggregations.

In a third implementation, alone or in combination with one or more of the first and second implementations, process 400 includes transmitting the natural language response via a communication channel that is selected based on the natural language prompt.

In a fourth implementation, alone or in combination with one or more of the first through third implementations, process 400 includes storing the schema information in a vector database, and querying the vector database to retrieve the schema information before converting the natural language prompt into the SQL query.

In a fifth implementation, alone or in combination with one or more of the first through fourth implementations, executing the SQL query includes scheduling execution of the SQL query according to a monitoring interval indicated in the natural language prompt.

In a sixth implementation, alone or in combination with one or more of the first through fifth implementations, process 400 includes transmitting a command to instantiate a service ticket in an issue tracking system based on an anomaly detected in the monitoring results.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations described herein to the precise forms that are described. Modifications and variations may be made in light of the above description or may be acquired from practice of the implementations described herein.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations described herein. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or described in the specification, these combinations are not intended to limit the implementations described herein. In fact, many of these features may be combined in ways not specifically recited in the claims and/or described in the specification. Although each dependent claim listed below may directly depend on only one claim, the description includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a component" or "one or more components" (or another element, such as "a processor" or "one or more processors") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items,), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
one or more processors and memory storing instructions that, when executed by the one or more processors, cause the device to:
receive, via a user interface, a natural language prompt from a user;
generate, by a large language model (LLM), a vector representation of the natural language prompt;
retrieve, from a vector database, schema information associated with a monitoring database, the schema information including vector embeddings of database entities;
convert, by the LLM and using the vector representation of the prompt and the vector embeddings of the schema information, the natural language prompt into a structured query language (SQL) query;
execute the SQL query against the monitoring database;
receive monitoring results from the monitoring database based on executing the SQL query;
detect, by the device, an execution error resulting from a schema mismatch or schema change in the monitoring database;
in response to detecting the execution error, execute a schema query to generate updated schema information from the monitoring database, and store the updated schema information in the vector database;
regenerate, by the LLM, the SQL query using the updated schema information; and
convert the monitoring results into a natural language response, using the LLM, for output to the user via the user interface.

2. The device of claim 1, wherein the one or more processors are configured to:
convert the natural language prompt into an initial SQL query using the LLM and vector embeddings corresponding to previous schema information;
detect an execution error indicative of schema mismatch or change based on executing the initial SQL query; and
in response to detecting the execution error, automatically update the schema information by transmitting a schema query to the monitoring database and updating the vector database with new vector embeddings.

3. The device of claim 1, wherein, to convert the natural language prompt into the SQL query, the one or more processors are configured to:
map extracted information from the natural language prompt to database entities represented by vector embeddings of the schema information using the LLM; and
construct one or more SQL commands in the SQL query to handle joins, filters, or aggregations.

4. The device of claim 1, wherein the one or more processors are configured to:
store the schema information in a vector database; and
query the vector database to retrieve the schema information before converting the natural language prompt into the SQL query.

5. The device of claim 1, wherein, to execute the SQL query, the one or more processors are configured to:
schedule execution of the SQL query according to a monitoring interval indicated in the natural language prompt.

6. The device of claim 1, wherein the one or more processors are configured to:

transmit a command to instantiate a service ticket in an issue tracking system based on an anomaly detected in the monitoring results.

7. A method, comprising:
receiving, via a user interface of a query system, a natural language prompt from a user;
generating, by a large language model (LLM), a vector representation of the natural language prompt;
retrieving, from a vector database, schema information associated with a monitoring database, the schema information including vector embeddings of database entities;
converting, by the LLM and using the vector representation of the prompt and the vector embeddings of the schema information, the natural language prompt into a structured query language (SQL) query;
executing, by the query system, the SQL query against the monitoring database to receive monitoring results;
detecting, by the query system, an execution error resulting from a schema mismatch or schema change in the monitoring database;
in response to detecting the execution error, automatically updating the schema information by transmitting a schema query to the monitoring database and updating the vector database with new vector embeddings;
regenerating, by the LLM, the SQL query using the updated schema information; and
converting, by the query system, the monitoring results into a natural language response, using the LLM, for output to the user via the user interface.

8. The method of claim 7, wherein converting the natural language prompt into the SQL query comprises:
generating, by the LLM, an initial SQL query using the vector representation of the natural language prompt and vector embeddings corresponding to a previous version of the schema information;
detecting, by the query system, an execution error based on executing the initial SQL query; and
in response to detecting the execution error, updating the schema information by transmitting a schema query to the monitoring database and updating the vector database with new vector embeddings.

9. The method of claim 7, wherein converting the natural language prompt into the SQL query comprises:
mapping, by the query system and using vector representations and vector embeddings, extracted information from the natural language prompt to database entities represented by the schema information; and
constructing, by the query system, one or more SQL commands in the SQL query to handle joins, filters, or aggregations.

10. The method of claim 7, further comprising:
transmitting, by the query system, the natural language response via a communication channel that is selected based on the natural language prompt.

11. The method of claim 7, further comprising:
storing, by the query system, the schema information in a vector database; and
querying, by the query system, the vector database to retrieve the schema information before converting the natural language prompt into the SQL query.

12. The method of claim 7, wherein executing the SQL query comprises:
scheduling, by the query system, execution of the SQL query according to a monitoring interval indicated in the natural language prompt.

13. The method of claim 7, further comprising:
transmitting, by the query system, a command to instantiate a service ticket in an issue tracking system based on an anomaly detected in the monitoring results.

14. A non-transitory computer-readable medium storing a set of instructions, the set of instructions comprising:
one or more instructions that, when executed by one or more processors of a device, cause the device to:
receive, via a user interface, a natural language prompt from a user;
generate, by a large language model (LLM), a vector representation of the natural language prompt;
retrieve, from a vector database, schema information associated with a monitoring database, the schema information including vector embeddings of database entities;
convert, by the LLM and using the vector representation of the prompt and the vector embeddings of the schema information, the natural language prompt into a structured query language (SQL) query;
execute the SQL query against the monitoring database to receive monitoring results;
detect, by the device, an execution error resulting from a schema mismatch or schema change in the monitoring database;
in response to detecting the execution error, automatically update the schema information by transmitting a schema query to the monitoring database and update the vector database with new vector embeddings;
regenerate, by the LLM, the SQL query using the updated schema information; and
convert the monitoring results into a natural language response, using the LLM, for output to the user via the user interface.

15. The non-transitory computer-readable medium of claim 14, wherein the one or more instructions cause the device to:
convert the natural language prompt into an initial SQL query using the LLM and vector embeddings corresponding to previous schema information;
detect an execution error indicative of schema mismatch or change based on executing the initial SQL query; and
in response to detecting the execution error, automatically update the schema information by transmitting a schema query to the monitoring database and update the vector database with new vector embeddings.

16. The non-transitory computer-readable medium of claim 14, wherein the instructions, that cause the device to convert the natural language prompt into the SQL query, cause the device to:
map extracted information from the natural language prompt to database entities represented by vector embeddings of the schema information using the LLM; and
construct one or more SQL commands in the SQL query to handle joins, filters, or aggregations.

17. The non-transitory computer-readable medium of claim 14, wherein the one or more instructions cause the device to:
store the schema information in a vector database; and
query the vector database to retrieve the schema information before converting the natural language prompt into the SQL query.

18. The non-transitory computer-readable medium of claim 14, wherein the instructions, to execute the SQL query, the one or more processors are configured to:

schedule execution of the SQL query according to a
monitoring interval indicated in the natural language
prompt.

19. The non-transitory computer-readable medium of
claim 14, wherein the one or more instructions further cause
the device to:

transmit a command to instantiate a service ticket in an
issue tracking system based on an anomaly detected in
the monitoring results.

20. The device of claim 1, wherein the one or more
processors are configured to, prior to converting the natural
language prompt into the SQL query, query the vector
database to retrieve the schema information and provide
both the natural language prompt and the schema informa-
tion as input to the LLM.

* * * * *